(12) United States Patent
Miglani et al.

(10) Patent No.: US 9,590,998 B2
(45) Date of Patent: Mar. 7, 2017

(54) NETWORK SWITCH WITH HIERARCHICAL SECURITY

(71) Applicant: CALIENT Technologies, Inc., Goleta, CA (US)

(72) Inventors: Jitender Miglani, Hollis, NH (US); Vijayan Thattai, Goleta, CA (US)

(73) Assignee: Calient Technologies, Inc., Goleta, CA (US)

( * ) Notice: Subject to any disclaimer, the term of this patent is extended or adjusted under 35 U.S.C. 154(b) by 162 days.

(21) Appl. No.: 14/322,043

(22) Filed: Jul. 2, 2014

(65) Prior Publication Data

US 2016/0006741 A1    Jan. 7, 2016

(51) Int. Cl.
*H04L 29/06* (2006.01)
*H04L 12/947* (2013.01)
*H04L 12/54* (2013.01)

(52) U.S. Cl.
CPC ............ *H04L 63/102* (2013.01); *H04L 49/25* (2013.01); *H04L 63/20* (2013.01); *H04L 12/56* (2013.01)

(58) Field of Classification Search
CPC combination set(s) only.
See application file for complete search history.

(56) References Cited

U.S. PATENT DOCUMENTS

| | | | |
|---|---|---|---|
| 5,037,173 A | 8/1991 | Sampsell et al. | |
| 5,832,228 A | 11/1998 | Holden et al. | |
| 6,067,620 A | 5/2000 | Holden et al. | |
| 6,097,860 A | 8/2000 | Laor | |
| 6,411,751 B1 | 6/2002 | Giles et al. | |
| 6,456,751 B1 | 9/2002 | Bowers et al. | |
| 6,556,739 B1 | 4/2003 | Kruglick et al. | |
| 6,567,574 B1 | 5/2003 | Ma et al. | |
| 6,571,029 B1 | 5/2003 | Kruglick et al. | |
| 6,587,611 B1 | 7/2003 | Hunt | |
| 6,628,041 B2 | 9/2003 | Lee et al. | |
| 6,690,885 B1 | 2/2004 | Aksyuk et al. | |
| 6,728,016 B1 | 4/2004 | Hunt et al. | |
| 6,792,177 B2 | 9/2004 | Welsh et al. | |
| 6,798,992 B1 | 9/2004 | Bishop et al. | |
| 6,819,815 B1 | 11/2004 | Corbalis et al. | |
| 6,823,101 B2 | 11/2004 | Gates, II et al. | |
| 6,836,381 B2 | 12/2004 | Giles et al. | |
| 6,898,341 B2 | 5/2005 | Huang et al. | |
| 6,922,500 B2 | 7/2005 | Huang et al. | |

(Continued)

*Primary Examiner* — Jeffrey Pwu
*Assistant Examiner* — Samuel Ambaye
(74) *Attorney, Agent, or Firm* — SoCal IP Law Group LLP; John E. Gunther; Steven C. Sereboff (57) ABSTRACT

Network switches and methods are disclosed. A network switch may include multiple input ports and multiple output ports, a switch fabric, and switch controller. The controller may receive and store data identifying a plurality of users and data defining which input ports and which output ports each user has authority over. The controller may receive, from a requesting user from the plurality of users, a request to make a connection between a selected input port and a selected output port. The controller may determine, based on the stored data, if the requesting user has authority over both the selected input port and the selected output port. The controller may refuse to make the requested connection if the requesting user does not have authority over both the selected input port and the selected output port.

16 Claims, 7 Drawing Sheets

(56) References Cited

U.S. PATENT DOCUMENTS

| | | |
|---|---|---|
| 6,980,712 B2 | 12/2005 | Huang et al. |
| 7,190,509 B2 | 3/2007 | Bruns |
| 7,239,773 B2 | 7/2007 | Sakai et al. |
| 7,676,125 B2 | 3/2010 | Zheng et al. |
| 7,873,984 B2 | 1/2011 | Hammons et al. |
| 8,346,925 B2 | 1/2013 | Holden et al. |
| 8,539,571 B2 | 9/2013 | Smith |
| 8,682,117 B1 | 3/2014 | Magliani et al. |
| 8,712,239 B1 | 4/2014 | Magliani et al. |
| 2002/0176431 A1* | 11/2002 | Golla .............. H04L 49/254 370/412 |
| 2003/0072312 A1* | 4/2003 | Alasti .............. H04L 49/254 370/395.4 |
| 2003/0120915 A1 | 6/2003 | Kleinsteiber et al. |
| 2005/0286891 A1 | 12/2005 | Sakai et al. |
| 2009/0323149 A1 | 12/2009 | Mizukami et al. |
| 2010/0020378 A1 | 1/2010 | Yamaguchi et al. |
| 2013/0346645 A1* | 12/2013 | Mayhew ............ G06F 15/167 710/52 |

\* cited by examiner

NETWORK SWITCH WITH HIERARCHICAL SECURITY

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates to data communications networks and more particularly to network switches with hierarchical security.

Description of the Related Art

Communications networks commonly contain a mesh of transmission paths which intersect at hubs or nodes. The transmission paths may be wired, wireless, or optical. Optical fiber links are commonly used to provide high bandwidth transmission paths between nodes. Such optical fiber links form the backbone of wide area networks such as the Internet. Optical fiber links are also applied in high bandwidth local area networks which may be used, for example, to connect server racks in large data centers or to connect processors in high performance computers.

At least some of the nodes in a communications network may include respective switches. In this patent, the term "switch" means a device that receives data or information arriving at a node via two or more incoming transmission paths and selectively forwards that data along two or more outgoing transmission paths. This definition of "switch" encompasses devices that may commonly be called switches, routers, and bridges. Switches used in communications networks include packet switches and circuit switches. Packet switches route data packets based on addressing information contained within each packet. Circuit switches connected designated transmission paths without regard for, or knowledge of, the content of the data traveling along the communications paths. Circuit switches may be optical or electronic.

An optical circuit switch is a switching device that forms connections between pairs of optical fiber communications paths without converting the optical signal into electrical signals. A typical optical circuit switch may have a plurality of ports and be capable of selectively connecting any port to any other port in pairs. Since an optical circuit switch does not convert information flowing over the optical fiber communication paths to electrical signals, the bandwidth of an optical circuit switch is essentially the same as the bandwidth of the optical communications paths. Further, since an optical circuit switch does not convert information into electrical signals, the power consumption of an optical circuit switch may be substantially lower than a comparable electronic circuit switch.

Whether a network uses packet switches, optical circuit switches, electronic circuit switches, or combinations thereof, it is paramount that data not be inadvertently or maliciously transmitted to an incorrect destination. To this end, security provisions may be incorporated into network switches.

Throughout this description, elements appearing in figures are assigned three-digit reference designators, where the most significant digit is the figure number where the element is introduced and the two least significant digits are specific to the element. An element that is not described in conjunction with a figure may be presumed to have the same characteristics and function as a previously-described element having the same reference designator.

DETAILED DESCRIPTION

Description of Apparatus

Figure 1:
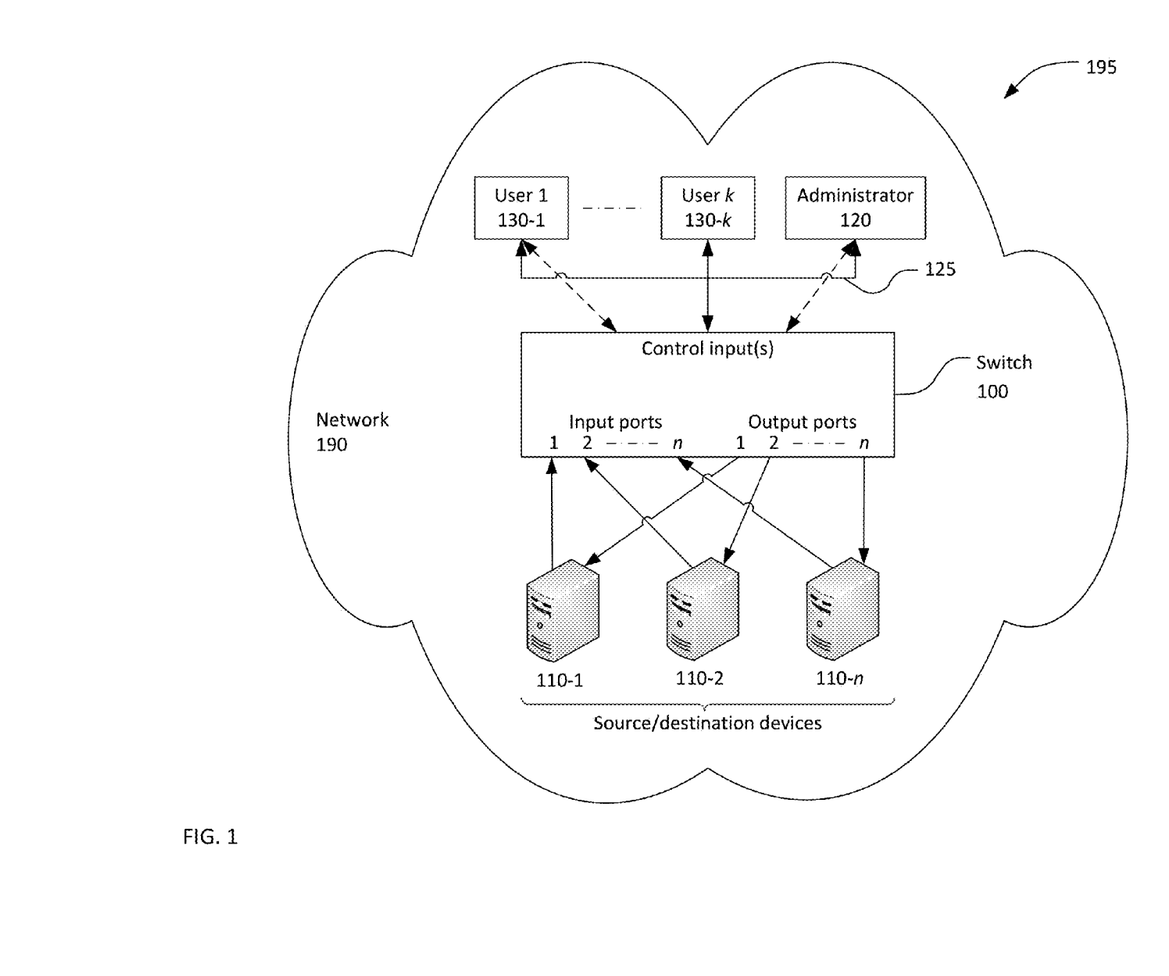
FIG. 1 is a block diagram of an environment for a network switch.

Referring now to FIG. 1, an environment 195 may include a switch 100 within a network 190. The switch 100 may be an optical circuit switch or some other type of switch. The switch 100 may have n input ports and n output ports, where n is an integer greater than or equal to two. Each of the n input ports and n output ports may be connected to a source/destination device. In this patent, the term "source/destination device" encompasses computers, servers, storage devices, peripheral equipment, and other equipment that are a source or destination or both for data communicated over the network 190. In the example of FIG. 1, each input port and each output port is connected to a respective source/destination device, of which source/destination devices 110-1, 110-2, and 110-n are shown. In other networks, multiple ports of a switch may be connected to a common source/destination device, and some ports of a switch may be connected to other switches rather than source/destination devices. The input and output ports of a switch may be grouped in pairs to provide a full duplex or bidirectional connection to each source/destination device.

The switch 100 may have one or more control inputs to receive configuration data from an administrator 120 and to receive connection requests from k users, where k is a positive integer, of which only user 130-1 and user 130-k are shown. The configuration data from the administrator and requests from the users may be received via a bus or network 125, via discrete connections as indicated by the dashed arrows, or by a combination of discrete connections and a bus or network. The network 125, if present, may be a part of the network 190 or may be a control network independent of the network 125.

Each user 130-1 to 130-$k$ is entity that uses the switch 100 to transfer data between source/destination devices. A user is generally not a source or destination of data communicated through the switch 100. In some circumstances, a device within the network 190 may function as both a user and a source/destination device. Each user may generate requests to the switch 100 to establish or break connections between pairs of input and output ports. Each user may have authority to establish or break connections between a portion of the input and output ports of the switch 100, and may not have authority to establish connections using other input and output ports.

Each user 130-1 to 130-$k$ may be a human operator that issues requests to the switch 100 via a corresponding user terminal. The user terminal may be, for example, a personal computer, a tablet computer, a smart phone, or some other device. In some cases, multiple human operators may issue requests to the switch 100 via a common user terminal. One or more of the users 130-1 to 130-$k$ may be an automatic network management application running on a server or other computing device. One or more of the users 130-1 to 130-$k$ may be a human operator interacting with a network management application running on a server or other computing device.

The administrator 120 may provide the switch 100 with configuration data including rules that govern how connections may be made between the switch's input and output ports. The configuration data provided by the administrator 120 may also include definitions of the authority of each of the users 130-1 to 130-$k$ to make connections through the switch 100. Each user may have authority over all or a portion of the ports of the switch 100. A user with authority over a port is permitted to use that port in connections through the switch 100. To make, break, inspect, or otherwise access a connection, the user must have authority over the ports at both ends of the connection. A user without authority over a port may not be permitted to make, break, inspect, or otherwise access connections that start or terminate at that port.

The administrator 120 may be a human operator that issues configuration data to the switch 100 via an administrator terminal. The administrator 120 may be an automatic network administration application running on a server or other computing device. The administrator 120 may be a human operator interacting with a network administration application running on a server or other computing device. The administrator 120 may be one of the users 130-1 to 130-$k$.

Figure 2:
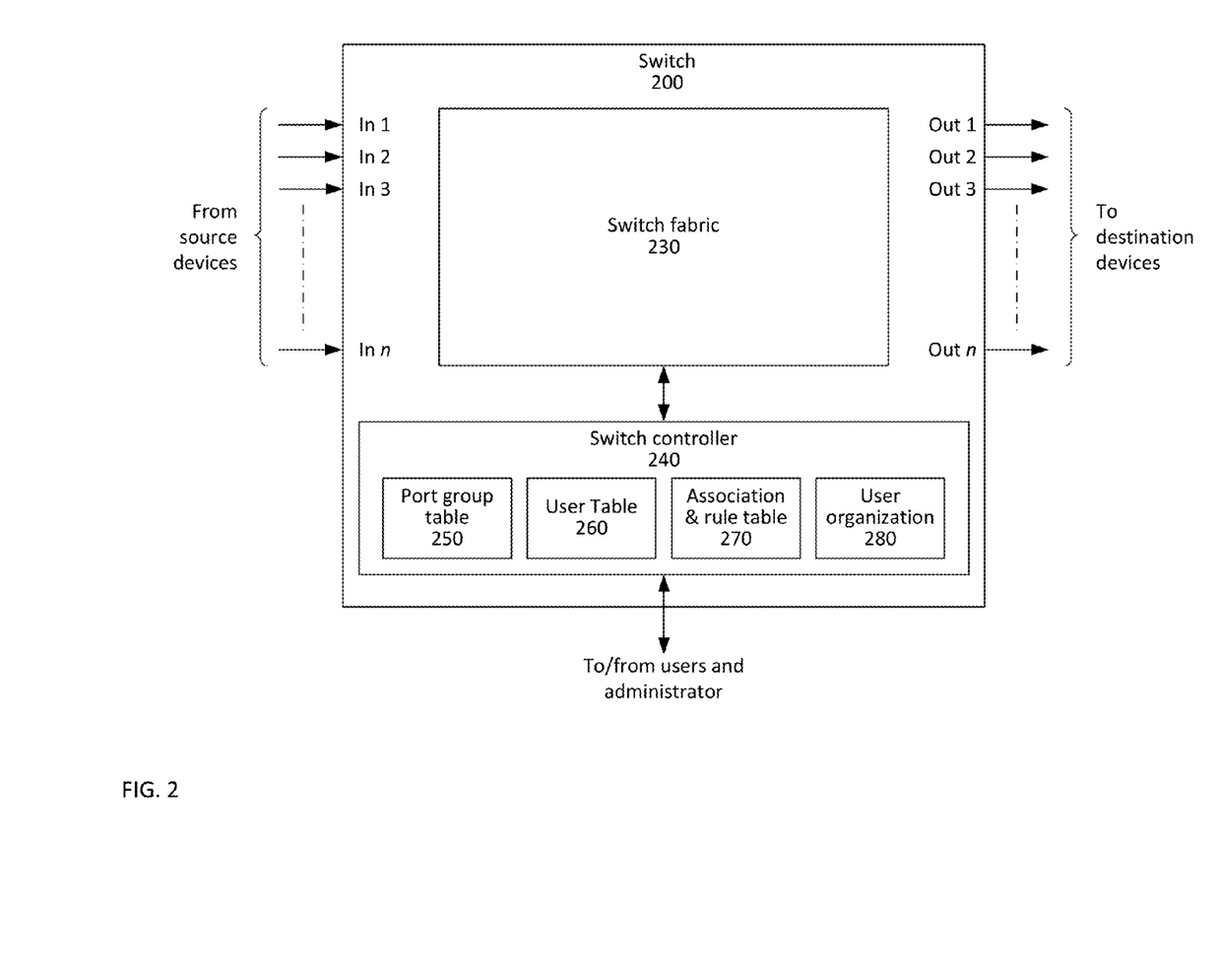
FIG. 2 is a block diagram of a network switch.

Referring now to FIG. 2, a switch 200 may include a switch fabric 230 configured to make selectable connections between input ports In 1 to In n and output ports Out 1 to Out n. Preferably, the switch fabric 230 may be non-blocking, which means that any available (i.e. not already connected) input port can be connected to any available output port regardless of other connections that already exist. Some or all of the input ports In 1 to In n may receive information from respective source devices. Some or all of the output ports Out 1 to Out n may accept information transferred across the switch fabric and transmit the information to respective destination devices. Many of the devices in a network may function both as a source and a destination for information and may thus be connected to both an input port and an output port of the switch 200.

The switch fabric 230 may provide connections from input ports to output ports as directed by a switch controller 240. The switch controller 240 may receive connection requests from users. Each connection request may identify an input port and an output port. Each connection request may ask that a connection be made between the identified ports or ask that an existing connection between the identified ports be broken. The switch controller 240 may determine whether or not each received connection request should be fulfilled. The switch controller 240 may then either reject the request or instruct the switch fabric 230 to create or break, as appropriate, the connection between the identified ports.

A variety of different information may be transmitted along connections through the switch 200. For example, the switch 200 may be a portion of a data center in which different assets (e.g. virtual servers or virtual storage devices) are allocated to different clients who may be business competitors. In this example, it is critical that one competitor's information is not sent, inadvertently or maliciously, to the other competitor. Even in applications within a single company, it may be critical that certain information (e.g. personnel information or medical records) not be sent to an incorrect destination.

To ensure that information received from a source device is not sent to an incorrect destination device, the switch controller 240 may enforce one or more security protocols. First, the authority of some or all of the users may be restricted. In particular, some or all users may be given authority over only a portion of the n input ports and the n output ports. For example, each user may be associated with one or more ports or groups of ports. Conversely, each port or group of ports may be associated with one or more users. In this case, each user may only have authority over ports with which they are associated. The authority over a subset of ports may be restricted such that only a predefined set of users have any rights with regard to the subset, regardless of any hierarchical user level.

Alternatively or additionally, each port and user may be assigned a security level from a plurality of hierarchical user levels. The switch controller 240 may enforce a protocol that the security level of a user requesting to make or break a connection must be at least as high as the security levels of the two ports to be connected.

Both user restrictions and hierarchical security levels may be enforced. For example, the plurality of users may be organized as a hierarchy having two or more levels. In this case, all of the users associated with any particular port may be located at the same level of the hierarchy. Each port may be considered to inherit a security level equivalent to the level of its associated users in the hierarchy. Users at higher levels of the hierarchy may have authority to make connections between ports with which they are associated and ports associated with some or all users at lower levels of the hierarchy.

Additionally, rules may be associated with some or all of the ports, or with some or all of the users. Simple examples of rules are "Port A can never be connected to port B," and "an input port may never be connected to an output port having a lower security level". Additional examples of rules will be provided during the subsequent discussion of FIG. 5 to FIG. 7.

To determine whether or not a connection request should be fulfilled, the switch controller 240 may make three fundamental determinations. First, the switch controller may determine if the requested action is even possible. For example, it is not possible to break a connection that does not exist. Further, it may be forbidden to make a connection using a port that is already used in an existing connection without first breaking the existing connection. Second, the switch controller 240 may determine if the requestor (i.e. the user that originated the connection request) has authority over both the input port and the output port identified in the request. Note that, to have authority over a port, the requestor does not necessarily have to be associated with the port. When users are arranged in a hierarchy, the requestor may acquire authority over ports at lower levels of the hierarchy. Third, the switch controller 240 may determine if the requested connection satisfies every rule associated with either the identified input port or the identified output port, which is to say the connection does not violate any rule associated with either the identified input port or the identified output port.

To assist the switch controller 240 in determining whether or not a connection request should be fulfilled, an administrator, such as the administrator 120, may provide data to populate a port group table 250, a user table 260, and an association & rule table 270. When users are arranged in a hierarchical organization, the administrator may also provide data describing the user organization 280.

Figure 3A:
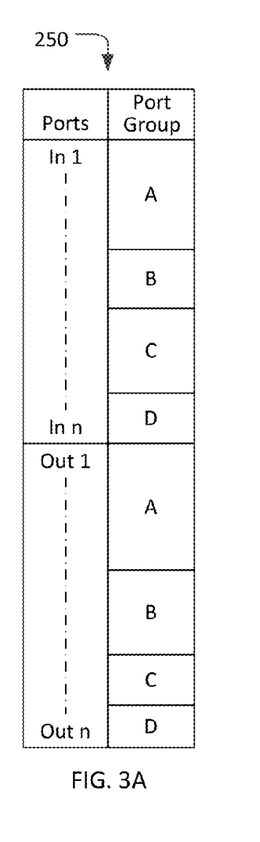
FIG. 3A is a graphical representation of a table associating ports with port groups.

Referring now to FIG. 3A, the port group table 250 may include a list of all input and output ports and the port group of which each port is a member. Each port may be a member of exactly one port group, and each port group may include one or more ports. In the example of FIG. 3A, n input ports and n output ports are organized into four port groups (A, B, C, D). A switch may have more or fewer than four port groups. In FIG. 3A, each port group is shown as comprised of consecutively numbered ports. This is not necessarily the case, and port groups may include discontinuously-numbered ports. Further, the number of member ports may be different for each port group, and the number of input ports and output ports in any port group may be equal or different. Organizing the ports of a switch into port groups may simplify defining rules and user authorities that govern operation of the switch. However, port groups are not required, and some switches may define user authority and rules for some or all ports individually.

Figure 3B:
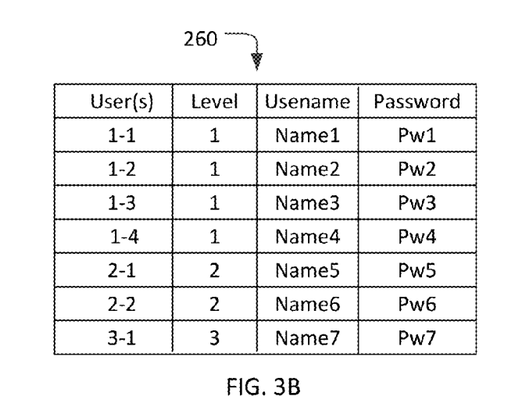
FIG. 3B is a graphical representation of a table of users.

Referring now to FIG. 3B, the user table 260 may list one or more users who may provide connection requests to the network switch. Each listed user may be assigned a security level. Optionally, user verification information such as a user name and/or a password may be included for some or all users.

Figure 3C:
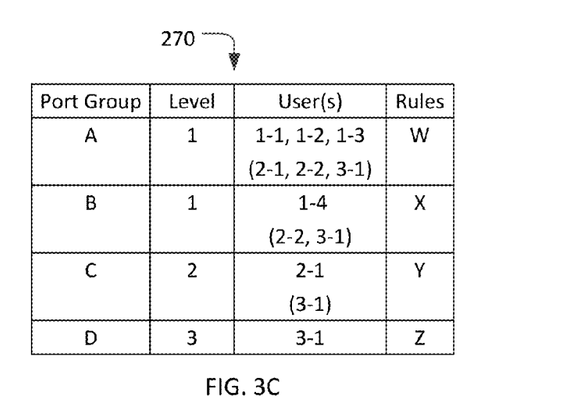
FIG. 3C is a graphical representation of a table associating port groups with users and rules.

Referring now to FIG. 3C, the association & rule table 270 may list each port group (or individual port if the ports are not organized into port groups), a security level for each port group, and one or more users associated with each port group. Optionally, the association & rule table 270 may list users who, while not associated with a port group, may inherit authority over the port group by virtue of a hierarchical organization of the users (shown in FIG. 3D). Users who may inherit authority over each port group are listed in FIG. 3C in parenthesis. Note that, in this example, user 2-2 is not associated with any port group but may inherit authority over ports groups A and B by virtue of the hierarchical organization. The security level of each port group may be assigned independently of the users associated with the port group or may be inherited from the security level of its associated users. The association & rule table 270 may also list a set of rules associated with each port group. In the example of FIG. 3C, the letters W, X, Y, and Z represent different sets of rules. In some cases, a common set of rules may apply to some or all ports groups.

Figure 3D:
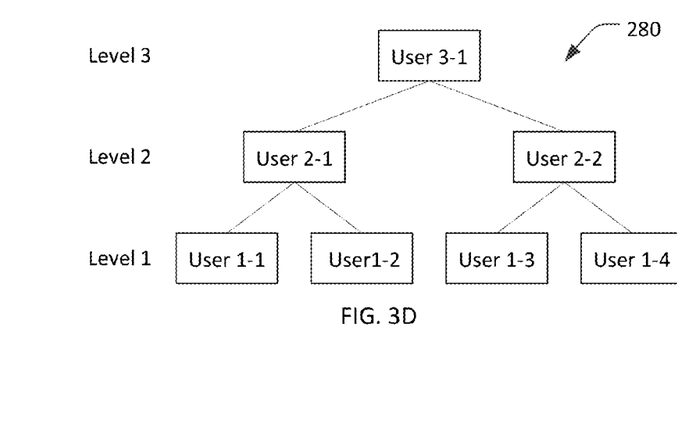
FIG. 3D is a graphical representation of a hierarchical user organization.

Referring now to FIG. 3D, a hierarchical user organization 280 may commonly be structured as a tree, with each user at a lower level of the tree reporting to a single user at a higher level of the tree. In the example of FIG. 3D, seven users are distributed across three security levels. Specifically, users 1-1, 1-2, 1-3, 1-4 are at security level 1, users 2-1 and 2-2 are at security level 2, and user 3-1 is at security level 3. A hierarchical user organization may have more than seven users and more than three levels. A hierarchical user organization may be organized in some manner other that a tree. The hierarchical user organization 280 may be stored by the switch controller 240 in the form of a table, a linked list, a tree, or some other data structure.

In the hierarchical user organization 280, a first user may be considered to "supervise" a second user if the first user is at a higher security level than the second user and there is a continuous link between the first and second user. For example, user 2-1 supervises users 1-1 and 1-2, and user 2-2 supervises user 1-3 and 1-4. User 3-1 directly supervises users 2-1 and 2-2. User 3-1 also supervises users 1-1 to 1-4 via users 2-1 and 2-2.

The use of the port group table 250, the user table 260, the association & rule table 270 and the hierarchical user organization 280 is exemplary. The same information may be organized and/or stored differently. For example, the user table 260 and the hierarchical user organization 280 could be combined into a single linked list. The user table 260 could include the ports associated with each user. The port group table 250 could include the rules associated with each port group.

Description of Processes

Figure 4:
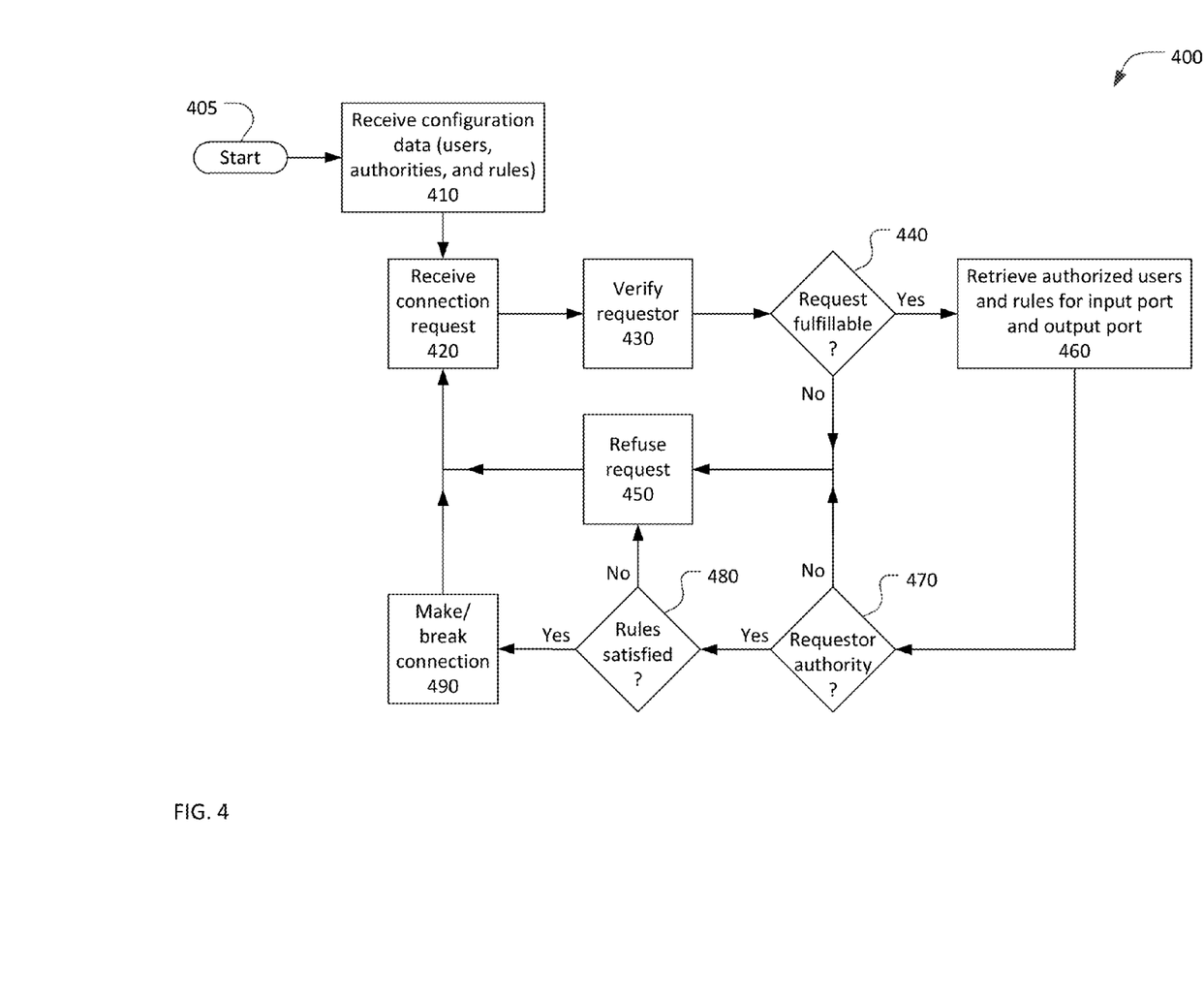
FIG. 4 is a flow chart of a process for managing connections through a network switch.

FIG. 4 is a flow chart of a process 400 for managing connections through a network switch. The process 400 may start at 405 when the network switch is integrated into a network, and may continue perpetually until the network switch is removed from service. The process 400 is inherently cyclic, and at least the actions 420 and 440-490 of the process 400 may be repeated for each connection made or broken through the network switch.

At 410, before any connections are made through the network switch, the network switch may receive configuration data including data identifying one or more users. The configuration may also include data defining, for each user, input ports and output ports that the user has authority over. A user that has "authority over" a particular port is permitted to make or break connections to or from that port. The configuration data may also include rules to be applied to managing connections through the optical circuit switch. The configuration data received at 410 may be provided by an administrator such as the administrator 120. The configuration data may include data to populate a port group table such as the port group table 250, a user table such as the user table 260, an association & rule table such as the association & rule table 270, and a user organization such as the hierarchical user organization 280.

The configuration data may be received at 410 via a dedicated connection to the administrator or over a bus or network. When the configuration data is received over a shared bus or network, the network switch may authenticate the identity of the administrator before accepting the configuration data. For example, the network switch may be assigned a unique identifier known only to the administrator. The configuration data may be encrypted, in which case the actions at 410 may include, for example, exchanging certificates and/or encryption keys and decrypting the configuration data. Although not shown in FIG. 4, the network switch may receive updated encryption data from the administrator at any time during its operation.

At 420, the network switch may receive a connection request from a user. The connection request may identify an input port and an output port, and request that either a connection be made between the identified ports or that an existing connection between the identified ports be broken. A connection request may identify two or more pairs of input and output ports and request that a connection be made or broken between each identified pair. The connection request may be received at 420 via a dedicated connection to each user or over a shared bus or network. When connection requests are received over a shared bus or network, each connection request may identify the requesting user.

As shown in FIG. 4, the process 400 includes actions to make or break a single connection. A connection request received at 420 may request that multiple connections may be made and/or broken. In this case, the actions of the process 400 may be repeated, sequentially or in parallel, independently for each connection to be made or broken.

At 430, the identity of the requesting user, or requestor, may be verified. For example, the requestor may provide a username and password, which the network switch may be compared to a list of approved user names and passwords received from the administrator at 410 and stored in a user table such as the user table 260. The connection request received at 420 may be encrypted, in which case verifying the requestor at 430 may include exchanging certificates and/or encryption keys. Verifying the requestor may be performed after receiving each connection request, as shown in FIG. 4. Alternatively, user may be verified and "logged in" once, either before submitting any connection request or in response to only the first connection request submitted by the user. Once logged in, the user may remain logged in until the user logs out or until a predetermined period of time elapses without any action by the user.

At 440, a determination may be made whether or not the connection request received at 420 can be fulfilled. For example, it is not possible to break a connection unless the identified connection already exists. The operating protocol of the network switch may forbid making a connection using a port that is already used in another connection without first submitting a request to break the older connection. When a determination is made that a request cannot be fulfilled ("no" at 440), the request may be refused at 450, and the process 400 may return to 420 to await receipt of another connection request. When a connection request is refused at 450 for any reason, a message may be sent to the requesting user indicating a reason for the refusal. When a determination is made at 440 that a connection request can be fulfilled ("yes" at 440), the process 400 may proceed to 460.

The connection request received at 420 identifies at least an input port, an output port, and a requesting user. At 460, a list of users having authority over the input port and the output port and any rules associated with either of the input port and the output port may be retrieved. For example, the input port and the output port may be members of respective port groups. The port groups may be identified using a port group table such as the port group table 250. Users associated with the identified port groups, and thus associated with the input port and the output port, may then be retrieved from an association & rule table such as the association & rule table 270. Each of the input port and the output port may be associated with at least one user. When users are organized in a hierarchical structure, the user organization may also be retrieved at 460.

Also at 460, one or more rules associated with the identified port groups, and thus associated with the input port and the output port, may also be retrieved from the user/rule table. The retrieved rules may govern how specific port groups or combinations of port groups may or may not be connected. The retrieved rules may govern how users do or do not acquire authority over some or all port groups. Examples of rules will be provided in the subsequent discussion of FIGS. 5 to 7.

At 470, a determination may be made whether or not the requesting user (requestor) has authority over both the input port and the output port identified in the connection request received at 420. The requesting user may have authority over the input port and/or the output port by virtue of being associated with one or both ports, as indicated in the information retrieved at 460. The requesting user may have authority over the input port and/or the output port by virtue of the requesting user's position in a hierarchical user organization. For example, the requesting user may have authority over the input port and/or the output port by virtue of supervising one or more users associated with those ports. When the requesting user does not have authority over both of the identified input port and the identified output port ("no" at 470), the connection request may be refused at 450, and the process 400 may return to 420 to await receipt of another connection request.

When a determination is made at 470 that the requesting user does have authority over both of the input port and the output port ("yes" at 470), a further determination may be made at 480 whether or not the requested connection, if made, would satisfy (i.e. would not violate) all rules associated with the identified input port and all rules associated with the identified output port. When a determination is made at 480 that the requested connection would not satisfy all rules associated with either the input port or the output port ("no" at 480), the connection may be refused at 450, and the process 400 may return to 420 to await receipt of another connection request.

When a determination is made at 480 that the requested connection will satisfy all rules associated with the input port and the output port ("yes" at 480), the connection may be fulfilled at 490 by either making or breaking, as requested, a connection between the input port and the output port identified in the connection request. The process 400 may return to 420 to await receipt of another connection request.

Figure 5:
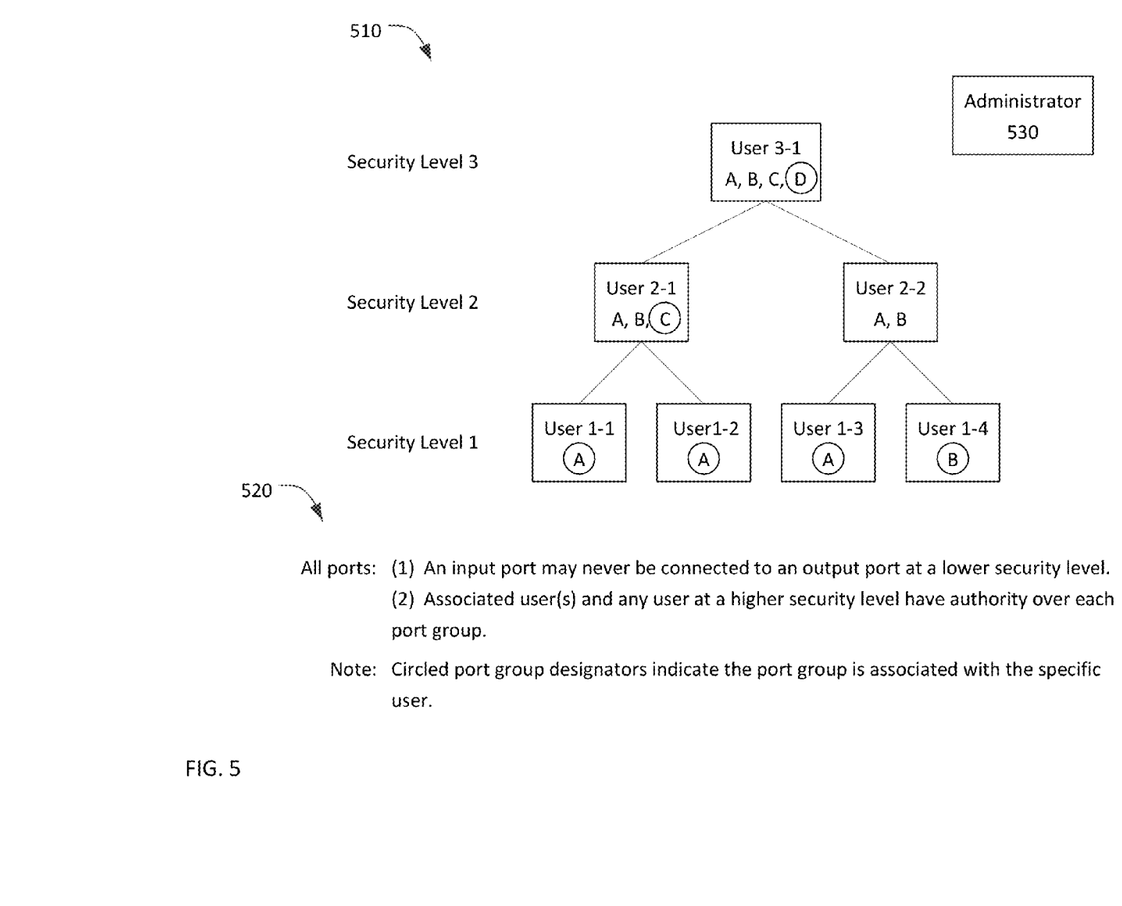
FIG. 5 is a graphical representation of rules applied to a set of users and port groups.

Referring now to FIG. 5, an exemplary network switch organization chart 510 is based on the port groups defined in FIG. 3A, the users defined in FIG. 3B, the user/port group associations defined in FIG. 3C, and the user organization defined in FIG. 3D. Users 1-1, 1-2, 1-3, 1-4, 2-1, 2-2, and 3-1 are organized in a hierarchical organization having three security levels. Each user has authority over one or more of port groups A, B, C, and D, which are listed below the user name in each box of the organization chart. Port group identifiers that are encircled are associated with the corresponding user. Specifically, port group A is associated with users 1-1, 1-2, and 1-3. Port group B is associated with user 1-4, port group C is associated with user 2-1, and port group D is associated with user 3-1.

All of the port groups are subject to two rules 520, as follows: (1) An input port may never be connected to an output port at a lower security level; and (2) Associated users and all users at higher security levels than the associated users have authority over each port group. Each of port groups A, B, C, and D are associated with one or more user.

With the defined associations, rules, and user organization, users 1-1, 1-2, and 1-3 have authority over only port group A, with which they are associated. Similarly, user 1-4 has authority only over port group B. User 2-1 has authority over associated port group C. Additionally, user 2-1 has authority over port groups A and B by virtue of being at a higher security level. Similarly, user 2-2 has authority over port groups A and B by virtue of being at a higher security level, but does not have authority over port group C at the same security level. User 3-1 has authority over associated port group D. Additionally, user 3-1 has authority over port groups A, B, and C by virtue of being at a higher security level. Note that, under rule (2), the security level of each user determines what authority they inherit over port groups associated with lower level users, but the exact organization does not matter. For example, changing the organization to have user 1-3 report to user 2-1 has no effect on user authority.

Users 1-1, 1-2, and 1-3 can make or break connections where both the input port and the output port are in port group A. User 1-4 can make or break connections where both the input port and the output port are in port group B. Users 2-1 and 2-2 can make or break connections between ports in port groups A and B, including connections where one port is in port group A and the other port is in port group B. Additionally, user 2-1 can make or break connections where both the input port and the output port are in port group C. User 2-1 can also make connections between input ports in port group A or port group B and output ports in port group C, but not the converse due to rule (1). User 3-1 can make or break connections between ports in any port groups, subject to the limitations of rule (1).

Network switch configuration data, including port groups, users, user/port group associations, and user organization may have been defined by an administrator 530 prior to the network switch being placed into service. The network switch configuration data may be updated or revised by the administrator 530 during operation of the network switch. In some cases, the network administrator and the user at the top of the user organization (e.g. user 3-1) may be the same entity.

Figure 6:
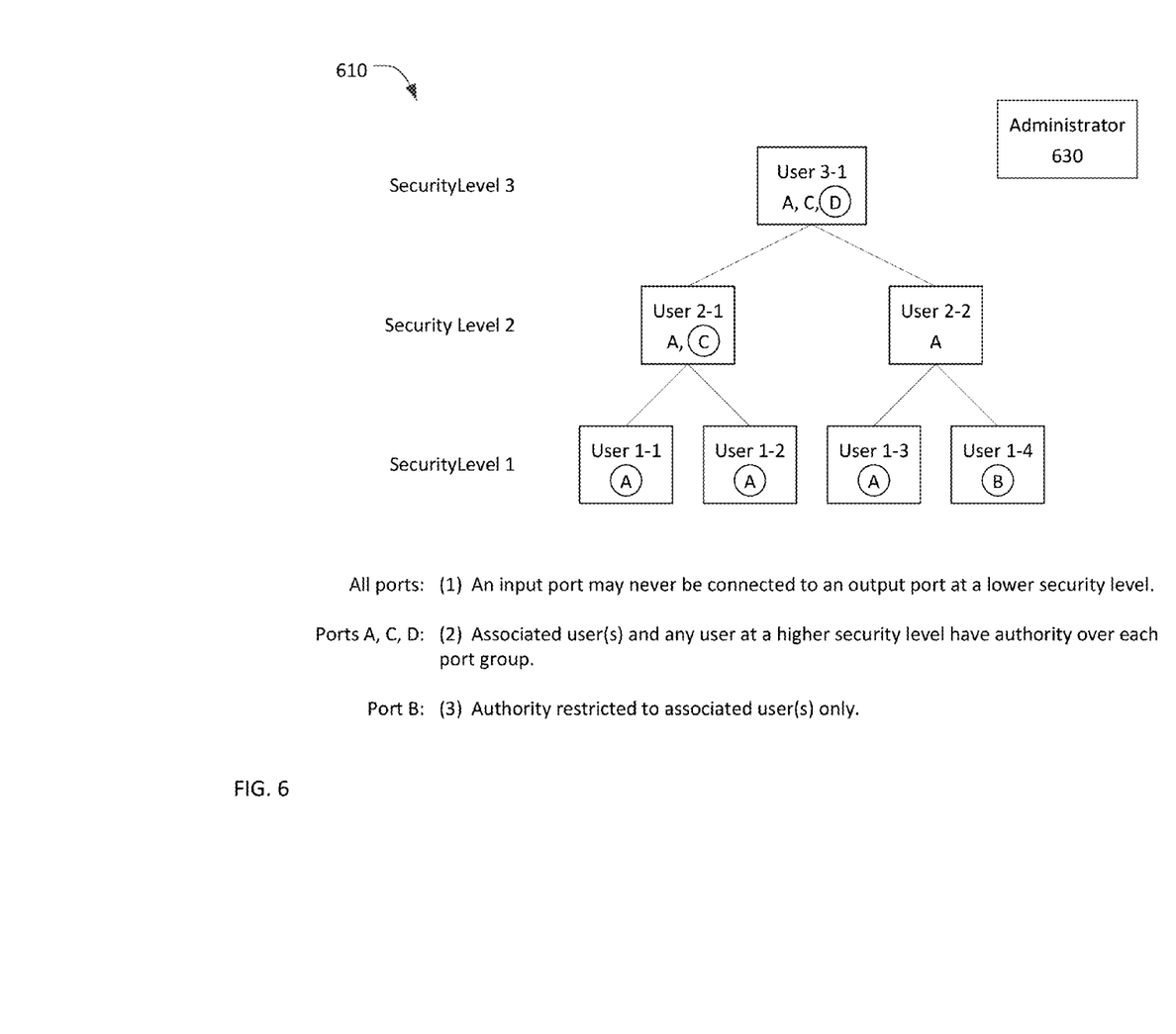
FIG. 6 is another graphical representation of rules applied to a set of users and port groups.

Referring now to FIG. 6, another exemplary network switch organization chart 610 is similar to the network switch organization chart 510 of FIG. 5, with the exception that port group B is subject to rule (3): Authority restricted to associated users only. With this additional rule, users 2-2 and 3-1 do not have authority over ports in port group B, and only user 1-4 can make or break connections between ports in port group B. Further, since only user 1-4 can make connections using ports in port group B, and user 1-4 has no authority over ports in any other port groups, it is not possible to make connections between a port in port group B and another port in any other port group.

Figure 7:
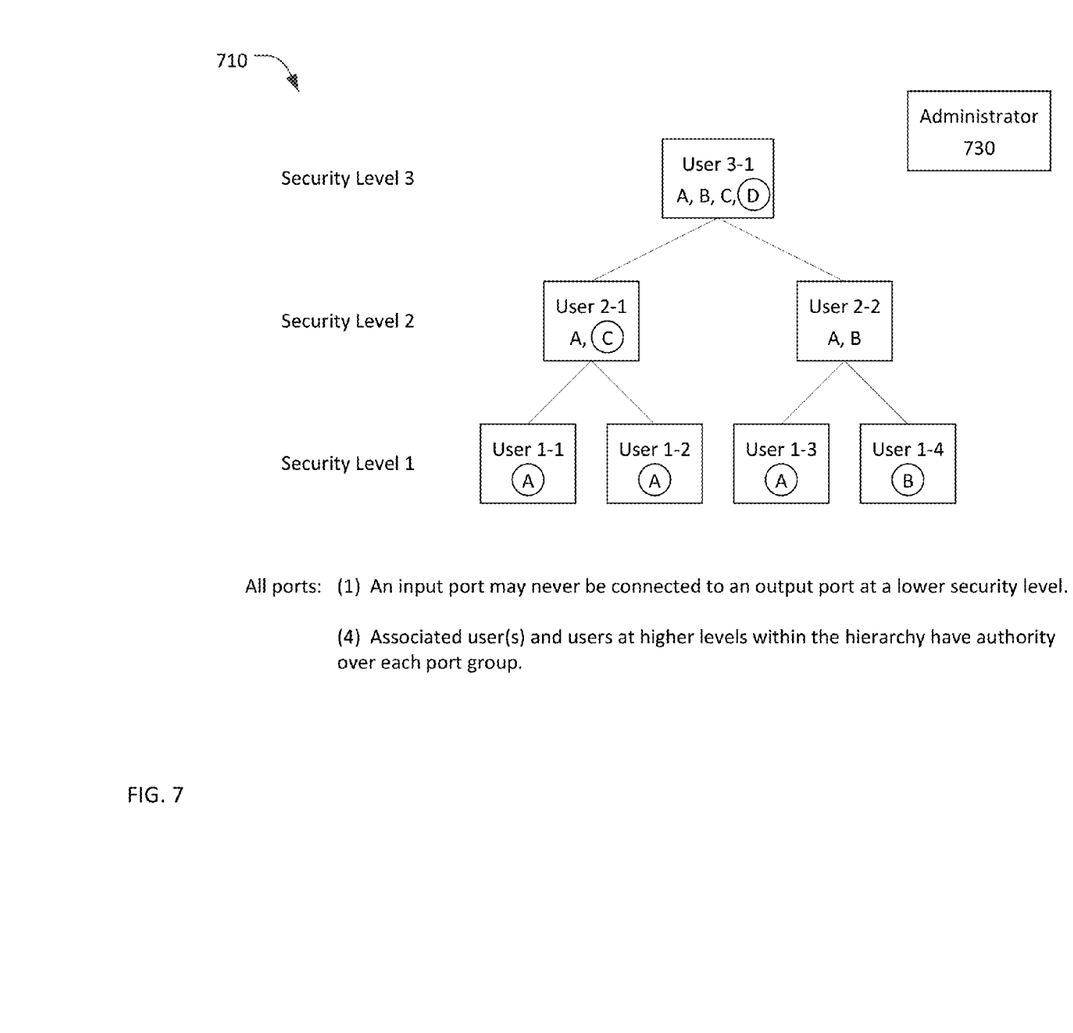
FIG. 7 is another graphical representation of rules applied to a set of users and port groups.

Referring now to FIG. 7, another exemplary network switch organization chart 710 is similar to the network switch organization chart 510 of FIG. 5, with the exception that all port groups are subject to rule (4) rather than rule (2): Associated user(s) and users at higher levels within the hierarchy have authority over each port group. Compared to FIG. 5, user 2-1 no longer has authority over ports in port group B, since user 2-1 is not above user 1-4 in the hierarchical organization. Only users 2-2 and 3-1 can make or break connections between a port in port group A and a port in port group B.

Note that, under rule (4), the reporting relationships in the user organization, in addition to user security level, determine the authority each user inherits over port groups associated with lower level users. For example, changing the organization to have user 1-3 report to user 2-1 would eliminate user 2-2's authority over port group A, even though user 2-2 is at a higher security level.

FIGS. 5, 6, and 7 are examples illustrating how a combination of user/port group associations, rules, user security levels, and user organization determines which users have authority over what port groups. A network switch configuration may have more or fewer than the four port groups, seven users, three security levels, and four rules contained in these examples.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A network circuit switch, comprising:
   a plurality of input ports and a plurality of output ports;
   a switch fabric coupled to the plurality of input ports and the plurality of output ports; and
   a switch controller configured to:
      receive and store configuration data including data identifying a plurality of users and data defining which of the plurality of input ports and which of the plurality of output ports each user has authority over;
      receive, from a requesting user from the plurality of users, a request to make a requested connection between a select input port from the plurality of input ports and a selected output port from the plurality of output ports,
      determine, based on the stored configuration data, if the requesting user has authority over both the selected input port and the selected output port, and
      refuse to make the requested connection if the requesting user does not have authority over both the selected input port and the selected output port.

2. The network circuit switch of claim 1, the switch controller further configured to:

cause the requested connection to be made from the selected input port to the selected output port via the switch fabric if the requesting user has authority over both the selected input port and the selected output port.

3. The network circuit switch of claim 1, the switch controller further configured to:
determine if the requested connection violates any of one or more rules associated with the selected input port and/or the selected output port,
refuse to make the requested connection if one or more rule is violated, and
cause the requested connection to be made from the selected input port to the selected output port via the switch fabric if the requesting user has authority over both the selected input port and the selected output port and no rule is violated.

4. The network circuit switch of claim 1, wherein
each of the plurality of input ports and each of the plurality of output ports is associated with one or more user from the plurality of users.

5. The network circuit switch of claim 4, wherein the requesting user has authority to make the requested connection if the requesting user is associated with both the selected input port and the selected output port.

6. The network circuit switch of claim 4, wherein
the plurality of users have a hierarchical organization wherein some users supervise other users, and
the requesting user has authority to make the requested connection if, for both the selected input port and the selected output port, the requesting user is either associated with the port or supervises another user that is associated with the port.

7. The network circuit switch of claim 4, wherein
each of the plurality of users is assigned to a level from two or more hierarchical security levels, and
the requesting user has authority to make the requested connection if, for both the selected input port and the selected output port, the requesting user is either associated with the port or assigned to a higher security level that another user that is associated with the port.

8. The network circuit switch of claim 4, wherein
the plurality of input ports and the plurality of output ports are organized as two or more ports groups, each port group containing one or more input and/or output port,
each of the two or more port groups is associated with one or more user from the plurality of users, and
each of the plurality of input ports and the plurality of output ports is a member of exactly one port group and inherits user associations from the port group of which it is a member.

9. A method for making connections in a network circuit switch having a plurality of input ports and a plurality of output ports, the method comprising:
receiving and storing configuration data including data identifying a plurality of users and data defining which of the plurality of input ports and which of the plurality of output ports each user has authority over;
receiving, from a requesting user from the plurality of users, a request to make a requested connection between a selected input port from the plurality of input ports and a selected output port from the plurality of output ports;
determining, based on the stored configuration data, if the requesting user has authority over both the selected input port and the selected output port; and
refusing to make the requested connection if the requesting user does not have authority over both the selected input port and the selected output port.

10. The method of claim 9, further comprising:
causing the requested connection to be made from the selected input port to the selected output port via a switch fabric if the requesting user has authority over both the selected input port and the selected output port.

11. The method of claim 9, further comprising:
determining if the requested connection violates any of one or more rules associated with the selected input port and/or the selected output port,
refusing to make the requested connection if one or more rule is violated, and
causing the requested connection to be made from the selected input port to the selected output port via a switch fabric if the requesting user has authority over both the selected input port and the selected output port and no rule is violated.

12. The method of claim 9, further comprising:
associating each of the plurality of input ports and each of the plurality of output ports with one or more user from the plurality of users.

13. The method of claim 12, wherein
the requesting user has authority to make the requested connection if the requesting user is associated with both the selected input port and the selected output port.

14. The method of claim 12, wherein
the plurality of users have a hierarchical organization wherein some users supervise other users, and
the requesting user has authority to make the requested connection if, for both the selected input port and the selected output port, the requesting user is either associated with the port or supervises another user that is associated with the port.

15. The method of claim 12, wherein
each of the plurality of users is assigned to a level from two or more hierarchical security levels, and
the requesting user has authority to make the requested connection if, for both the selected input port and the selected output port, the requesting user is either associated with the port or assigned to a higher security level that another user that is associated with the port.

16. The method of claim 12, wherein
the plurality of input ports and the plurality of output ports are organized as two or more ports groups, each port group containing one or more input and/or output port,
each of the two or more port groups is associated with one or more user from the plurality of users, and
each of the plurality of input ports and the plurality of output ports is a member of exactly one port group and inherits user associations from the port group of which it is a member.

* * * * *